(12) United States Patent
Wang et al.

(10) Patent No.: US 6,204,618 B1
(45) Date of Patent: Mar. 20, 2001

(54) STARTING METHOD FOR BRUSHLESS DC MOTOR AND DEVICE FOR THE SAME

(75) Inventors: King Yin Wang, Kaohsiung Hsien; Li-Te Kuo, Nan-Tau Hsien; Jieh-Yee Huang, Kaohsiung; Shyh-Jier Wang, Hsin-Chu Hsien; Tai-Fa Ying, Hsinchu; Der-Ray Huang, Hsinchu, all of (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 09/348,386

(22) Filed: Jul. 7, 1999

(30) Foreign Application Priority Data

Jun. 8, 1999 (TW) .................................................. 88109462

(51) Int. Cl.$^7$ ...................................................... H02P 6/22
(52) U.S. Cl. .......................................... 318/431; 318/254
(58) Field of Search .................................. 318/138, 254, 318/430, 431, 439, 685, 696

(56) References Cited

U.S. PATENT DOCUMENTS

| | | | |
|---|---|---|---|
| 3,609,487 | * | 9/1971 | Allison .................................. 318/138 |
| 3,972,535 | * | 8/1976 | Bleiman ............................. 318/696 X |
| 4,096,420 | * | 6/1978 | Gosling et al. ....................... 318/254 |
| 4,891,537 | * | 1/1990 | Shiraki et al. .................... 318/254 X |
| 6,072,652 | * | 6/2000 | Lee ......................................... 360/71 |

\* cited by examiner

Primary Examiner—Bentsu Ro
(74) Attorney, Agent, or Firm—W. Wayne Liauh

(57) ABSTRACT

The present invention is a starting method for brushless DC motor and a device for the same, especially adapted to provide the starting method for a single-phase DC brushless motor in an open circuit and the device for the same. According to the art as disclosed in the present invention, there are two successive steps in starting a motor. An oscillator signal is transmitted to the driver at first, which causes the motor to oscillate in both clockwise and counter-clockwise direction. An operating signal is then sent to cause the motor to rotate normally in one direction once the motor is out of the dead initiating position. By that the rotor can be triggered out of the dead initiating position when the motor is going to start and the motor can be smoothly operated under the low cogging torque.

12 Claims, 7 Drawing Sheets

STARTING METHOD FOR BRUSHLESS DC MOTOR AND DEVICE FOR THE SAME

FIELD OF THE INVENTION

The present invention relates a starting method for a brushless DC motor and a device for implementing the same. More specifically, the present invention relates to a starting method to be adapted in a single-phase DC brushless motor for use in an open circuit and a device for implementing the same, which can induce the rotor of a motor to be triggered away from the dead initiating position for an easier start when actuating the motor.

BACKGROUND OF THE INVENTION

Single-phase brushless DC motors are extensively used in the manufacturing the CPU cooler fan because it has the advantage of a lowered fabrication cost due to the easier assembly process and the higher fabrication reliability. However, the main concern over the motor design turns to how to lower the cogging torque and prevent the motor from being blocked on the dead initiating position when the motor of such kind is adapted for use under the conditions of a required low cogging torque (for example, the spindle motor in a CD-ROM). The lower cogging torque will require a greater precision in the assembly process. On the contrary, the higher cogging torque will induce the larger vibration in rotation to inevitably reduce the maneuverability of the motor. The problem that the rotor of a motor can be retained at the dead initiating position and thus become not easy to be re-started after the stop of the motor is therefore taken into account. The measure as known to the art is to resolve the problem by adopting the concept of detouring the magnetic flux and there are two ways of the most adopted. The first of which is to trim every pole of the stator into the asymmetrical shape while leaving the polar plates from trimming (as disclosed in the U.S. Pat. No. 5,093,599, U.S. Pat. No. 4,987,331, and U.S. Pat. No. 5,492,458). The cogging torque curve 16 as formed by such way is as illustrated in the FIG. 1. The rotor will stay at the point C as referred to FIG. 1 when the motor stops. By that, the problem caused by the dead initiating position will be avoided; however, the cogging torque for the motor is also increased. The second way is to keep the shapes of the poles of the stator in symmetric while trimming the edges of the polar plates into the arcs (as disclosed in the U.S. Pat. No. 5,744,889). The stopping position of the rotor will appear in two conditions as illustrated in FIG. 1. (1) When the stator is overly trimmed or inaccurately assembled, the cogging torque of the motor can probably turn to be inverse (as referred to the inverse curve 17 in FIG. 1). The stopping position of the rotor can be displaced to the dead initiating position A or E, which will cause to a difficult start for the motor. (2) Even if the polar plates of the motor are properly trimmed to lead the rotor to stop at point B or point D, the actual stop position of the rotor can be possibly close to or even exactly located on the dead initiating position A or E due to the mechanical friction, which has great influences on the manufacturing reliability in the mass-production. The cogging torque curve 18 for the motor assembly with the trimmed stator is as shown in FIG. 1, which presents a substantial shift on the stopping position compared to the motor with an untrimmed stator. A severe demand on the exact tolerances for the parts and the high accuracy on the assembly process should be therefore adopted to avoid the occurrence of such problems. From that, it can be concluded that the disclosure as known to the art cannot practically resolve the problems on the difficult start of the motor simply by detouring the magnetic flux to prevent the rotor from staying at the dead initiating position when the motor stops. Moreover, additional problems like the severe demand on the quality of the products and high accuracy on the assembly procedure are still raising to reduce the manufacturing reliability in the mass-production.

In the two disclosures as known to the art for resolving the problems caused by the dead initiating position in the single-phase DC brushless motor, the additional problems like the increasing of the cogging torque or the increasing probability on the rotor's stopping at the dead initiating position will be still rising no matter the shape of the stator is trimmed to an asymmetrical one or the shape of the stator is kept symmetrical while the edges of the polar plates are trimmed into arcs and yet the problems cannot be resolved.

SUMMARY OF THE INVENTION

It is the main objective of the present invention to provide a starting control method to trigger the rotor of a motor to be away from the dead initiating position when the motor is starting and a device for implementing the same. The present invention especially aims at triggering the rotor of a single-phase DC brushless motor out of the dead initiating position to allow the motor to rotate smoothly in case that the rotor stops at the dead initiating position. By realizing the method disclosed in the present invention, the motor's manufacturing reliability can be substantially raised and the single-phase DC brushless motor can be adopted with a more accurate phase control.

The start procedure for a motor comprises two steps according to the present invention. When starting a single-phase DC brushless motor, the motor is driven to do self-oscillation (as called by oscillating step) at first. The motor is then driven to rotate normally in one direction (as called by starting operation step) once the rotor is out of the dead initiating position. By that the rotor of the single-phase DC brushless motor can be triggered out of the dead initiating position even under a low cogging torque.

According to the art as disclosed in the present invention, an oscillator signal is firstly sent to a driver by a signal generator to drive the rotor of the motor to oscillate in both clockwise and counter-clockwise direction. The driver is sent with an operation signal to drive the rotor in one direction once the rotor is out of the dead initiating position. The oscillator signal and the operation signal can be integrated into a sequence of a start command and sent sequentially by the signal generator unit when starting the motor to drive it operating by steps. Alternatively, a triggering signal (comprising a period of high voltage and a period of low voltage) is firstly sent to a multiplexer by an oscillator. Then the multiplexer sends an oscillator signal to the driver, which produces an alternate current in the motor coils to form an oscillation and causes the stator and the rotor to expel each other. When the rotor is expelled away from the dead initiating position, the multiplexer is triggered by the simultaneous change on the voltage level of the trigger signal (for example, high voltage turns to be low voltage or vice versa) to transmit the operating signal to lead the motor to rotate in one direction.

For the fill and easy comprehension of the characteristics and merits disclosed by the aforesaid and other objects, it will be further described by preferred embodiments of the present invention accompanied by the illustrated drawings.

BRIEF EXPLANATION OF THE ATTACHED DRWAINGS

PREFERRED EMBODIMENTS OF THE PRESENT INVENTION

According to the art as disclosed in the present invention, the start procedure for a motor comprises two steps, which occupy a first time period and a second time period, respectively. An oscillator signal is firstly sent to a driver by a signal generator unit to drive the rotor of the motor to oscillate in both clockwise and counter-clockwise direction during the first time period. Then the driver is sent with an operation signal to drive the rotor in one direction once the rotor is out of the dead initiating position (called as the oscillating period). When the rotor is out of the dead initiating position, the signal generator unit will send an operating signal in the following second time period to drive the rotor of the motor to rotate in one direction and the start procedure of the motor is thereby accomplished. The followings are the two embodiments of the present invention accompanied by FIG. 2 to FIG. 9 for the further description of the art according to the present invention.

The First Embodiment

Figure 1:
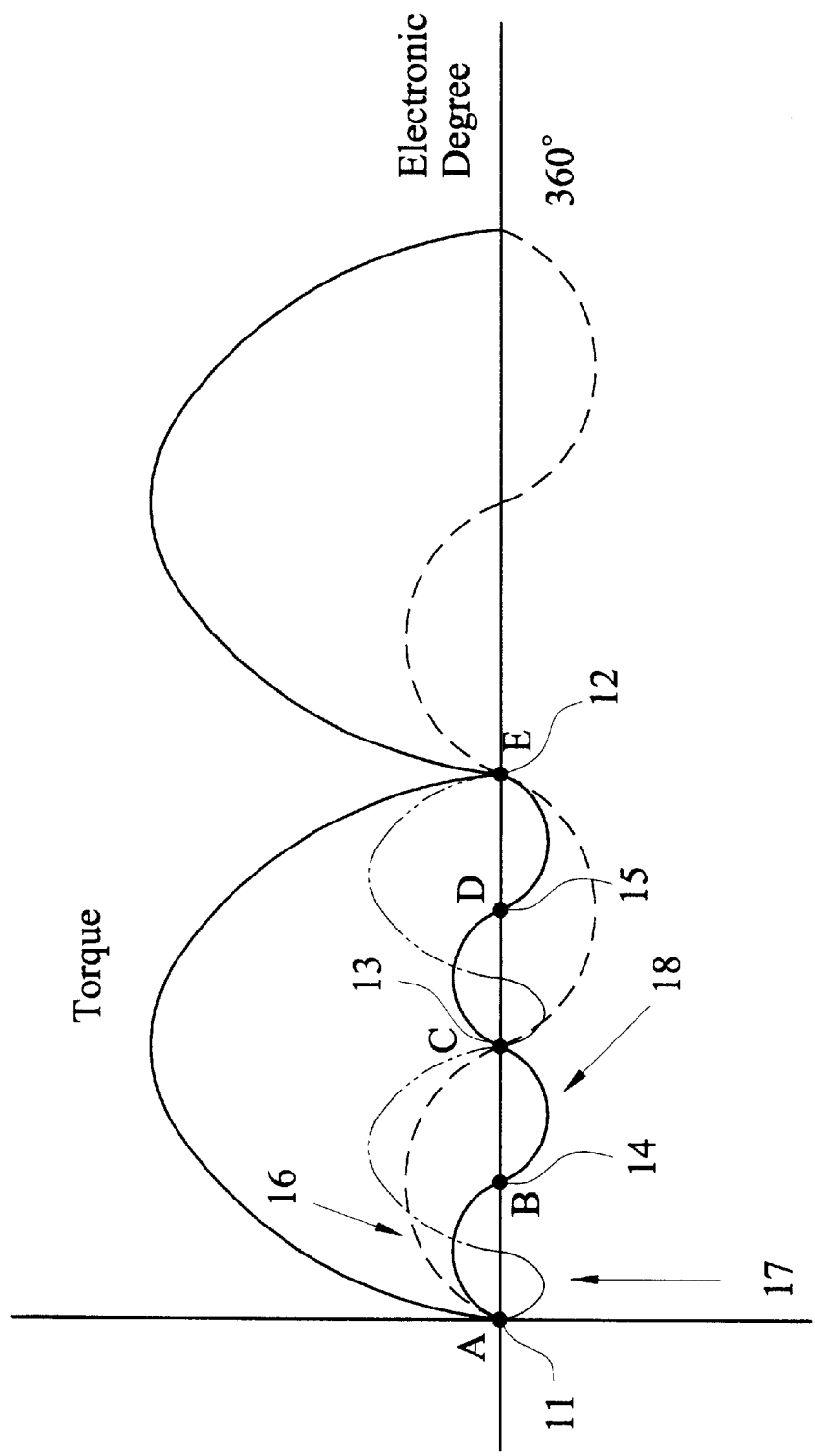
FIG. 1 is a cogging torque curve of a motor after assembly.
Figure 2:
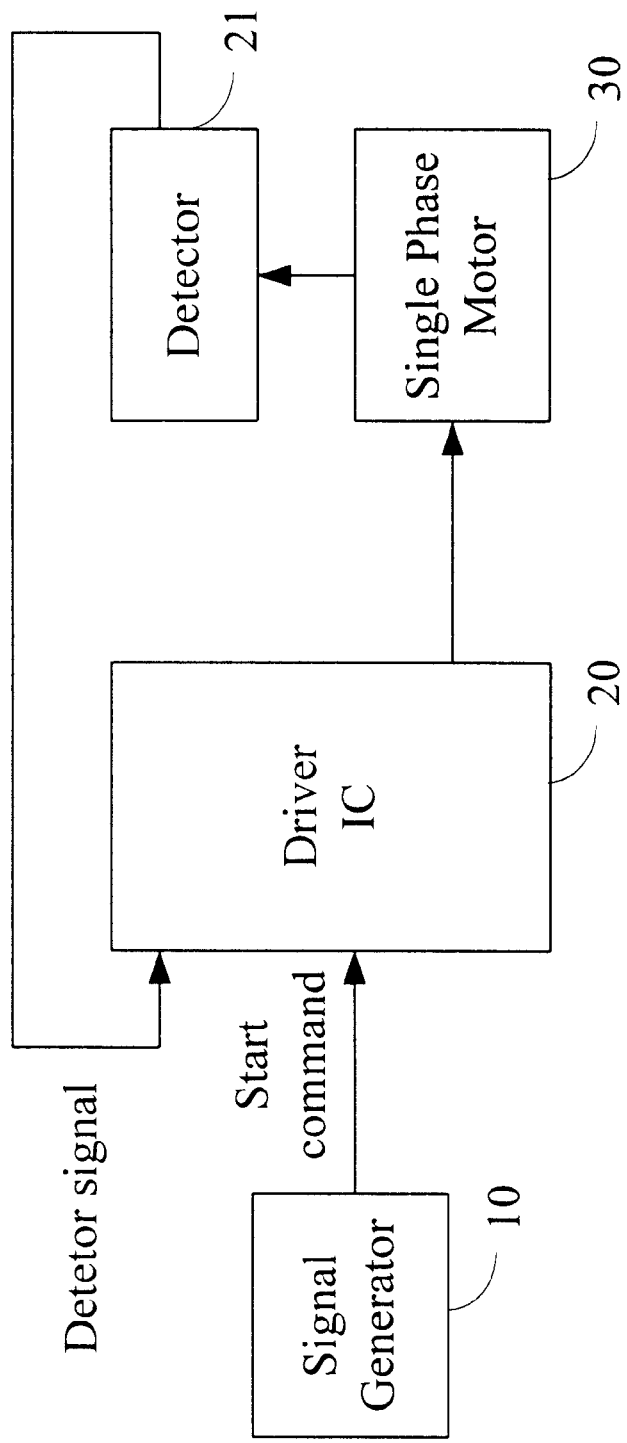
FIG. 2 is a block diagram for the first embodiment of the present invention.
Figure 3:
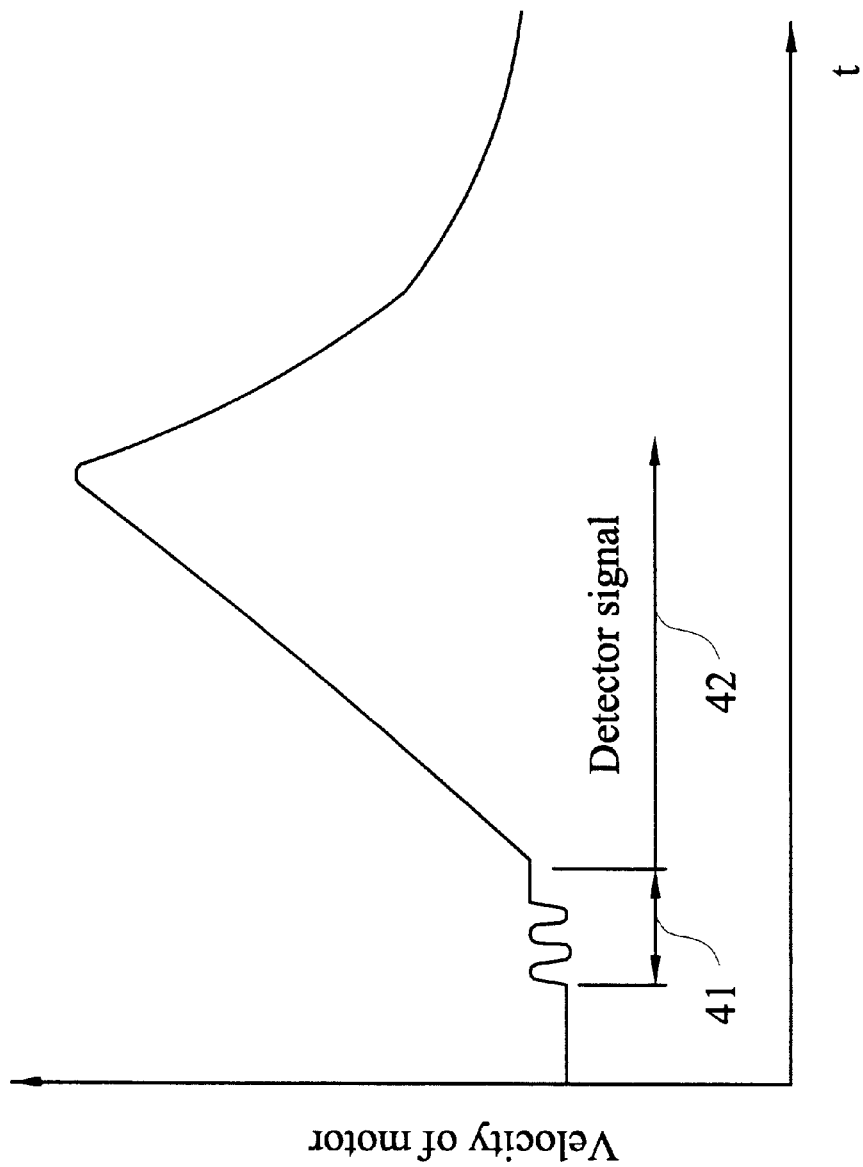
FIG. 3 is an operation curve for starting a motor according to the first embodiment of the present invention.

The realization of the first embodiment according to the art as disclosed in the present invention is as shown in FIG. 2, which comprises a signal generator unit 10, a driver 20 and a signal detector 21 (analogous velocity sensor or the like) for detecting the operation state of a motor 30. A start command for initiating the motor comprising a sequence of an oscillator signal and an operation signal is sent by the signal generator unit 10. The oscillator signal is firstly sent to the driver 20 by the signal generator unit 10 to drive the motor 30 to oscillate in both clockwise and counter-clockwise direction during the first time period. Then the driver 20 is sent with an operation signal to drive the motor 30 to rotate in one direction (clockwise or counter-clockwise direction) once the motor 30 is out of the dead initiating position (in the meanwhile, the first time period ends and the second time period begins). When the motor 30 is out of the dead initiating position, the signal generator unit 10 will send an operating signal in the following second time period to drive the motor 30 to rotate in one direction. The operation curve for starting the motor according to the first embodiment of the present invention is as shown in FIG. 3, wherein the x-coordinate represents time and y-coordinate the detector signal output by the signal detector 21. The section a 41 is the trace of the output detector signal by the signal detector 21 when the input start signal thereof is the type of the AC self-oscillating. The section b 42 is the trace of the output detector signal by the signal detector 21 when the input start signal thereof is the operating signal after the rotor is out of the dead initiating position.

The Second Embodiment

Figure 4:
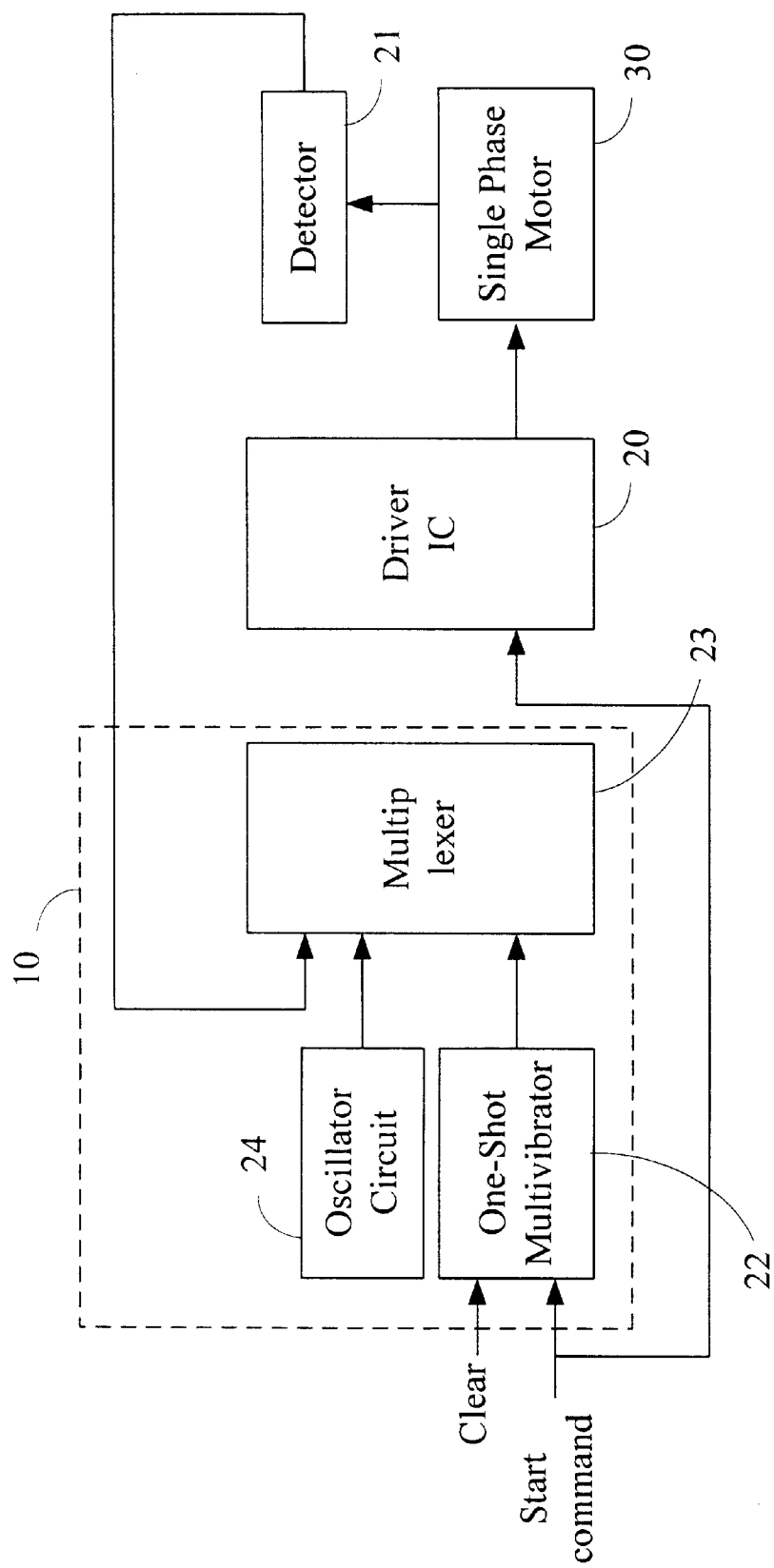
FIG. 4 is a block diagram for the second embodiment of the present invention.
Figure 5:
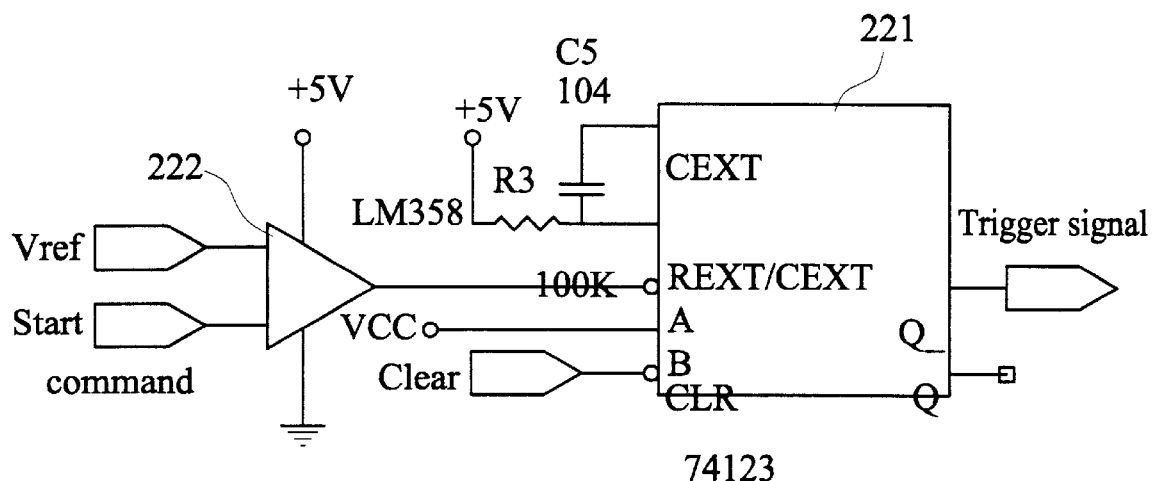
FIG. 5 is an illustrative circuit for generating the one-shot signal according to the second embodiment of the present invention.
Figure 6:
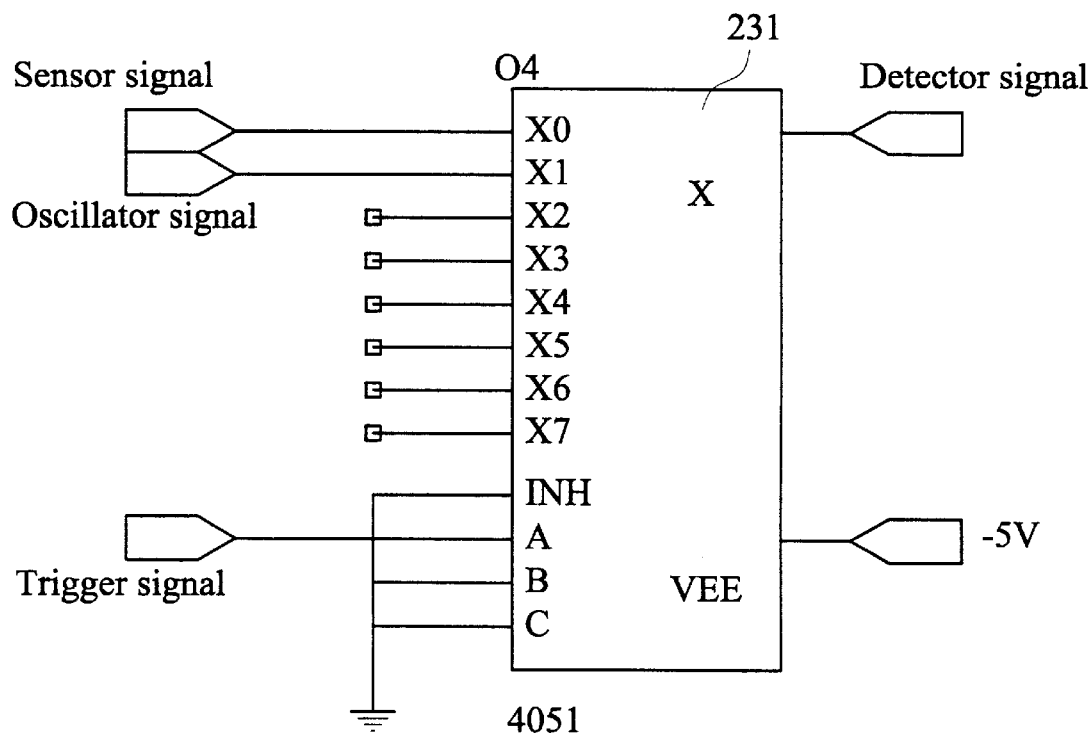
FIG. 6 is an illustrative circuit for the multiplexer according to the second embodiment of the present invention.
Figure 7:
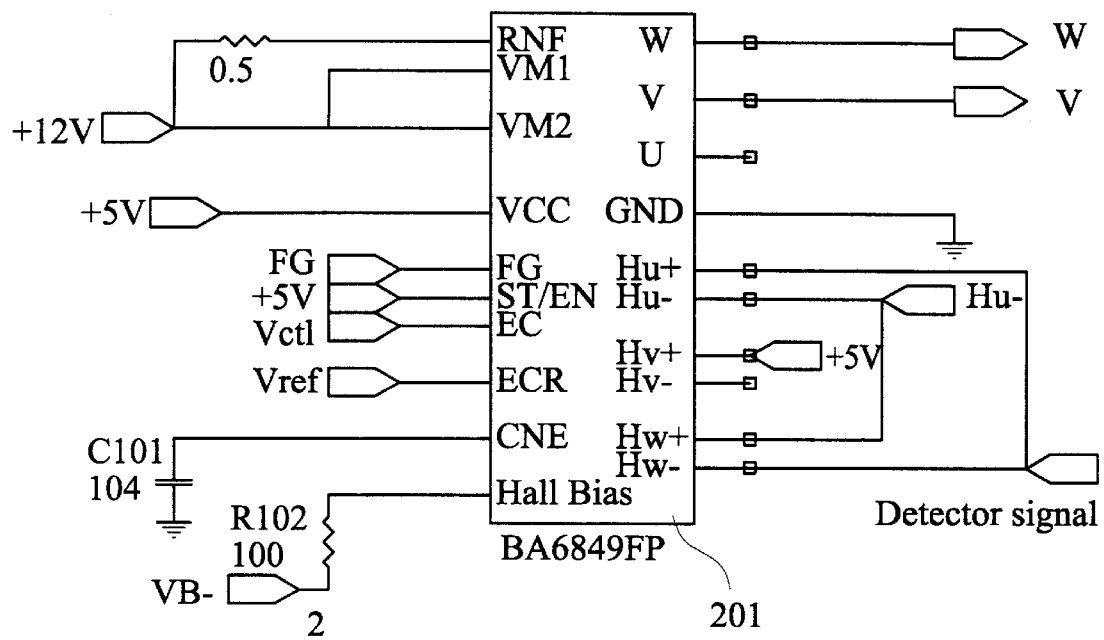
FIG. 7 is an illustrative circuit for the driver according to the second embodiment of the present invention.
Figure 8:
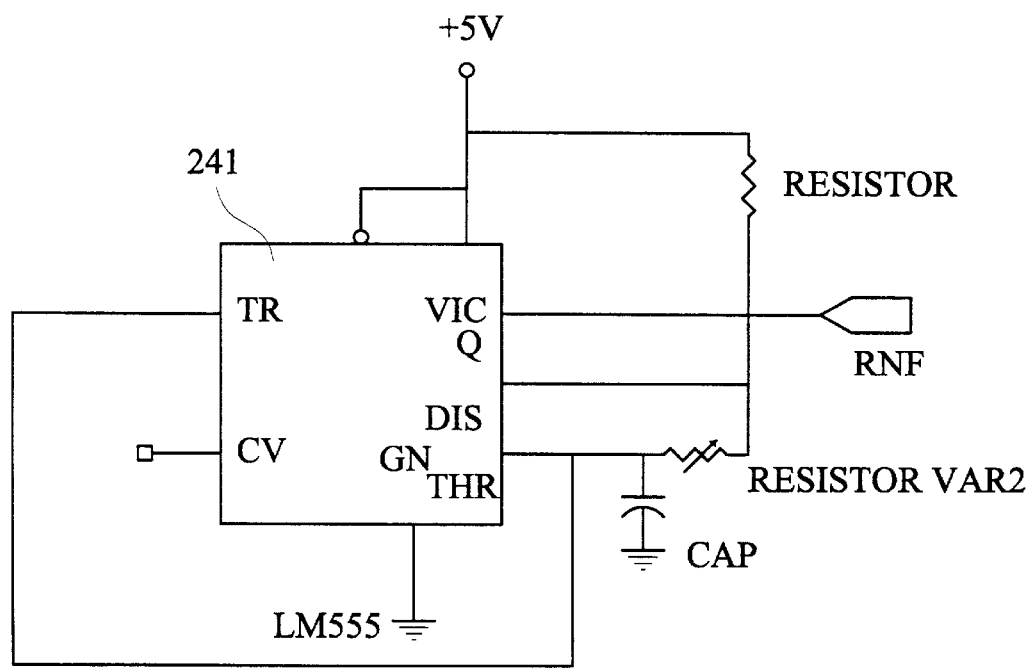
FIG. 8 is an illustrative circuit for generating oscillator signal according to the second embodiment of the present invention.
Figure 9:
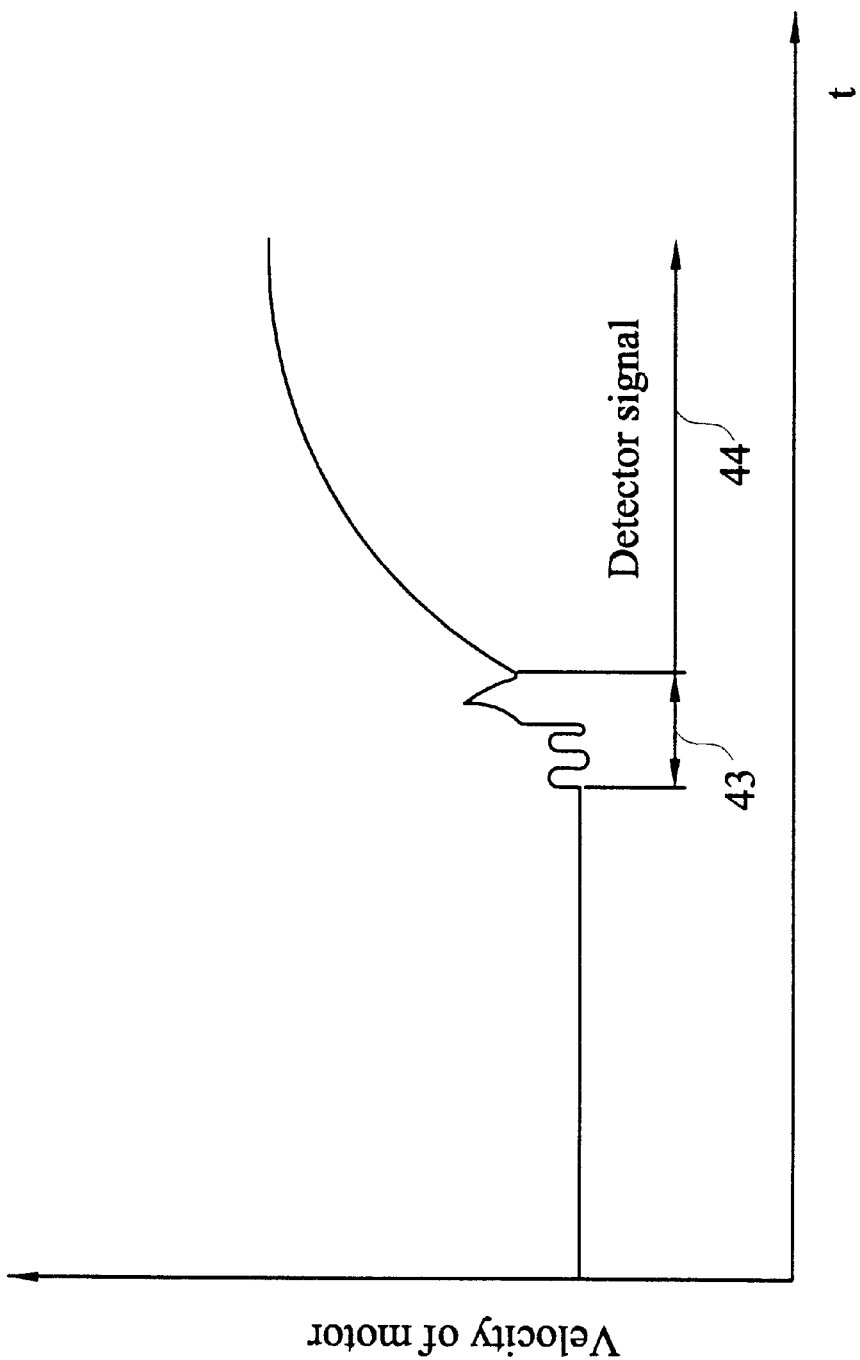
FIG. 9 is an operation curve for starting a motor according to the second embodiment of the present invention.

The realization of the second embodiment according to the art as disclosed in the present invention to start a motor is as shown in FIG. 4. The second embodiment is distinct from the first one in that the signal generator unit 10 according to the second embodiment comprises a one-shot multivibrator 22, a multiplexer 23, and an oscillator circuit 24. As referred to FIG. 5, the one-shot multivibrator 22 comprises an IC 221 (number 74LS123) and an IC 222 (number LM358). As referred to FIG. 6, the multiplexer 23 is consisted of an IC 231 (number 4051). While the driver 20 comprises an IC 201 (number BA6849FP) as referred to FIG. 7. The multiplexer 23 sends the oscillator signal to the driver 20 via the triggering signal by the multiplexer 23. The driver 20 causes the motor to rotate in both clockwise and counter-clockwise direction and leave the chance for the rotor to be out of the dead initiating position. The period of the triggering signal generated by the one-shot multivibrator 22 comprises a period of the high voltage and a period of the low voltage. Moreover, the multiplexer 23 can be designed according to the practical need to send the oscillator signal during the high voltage period (or send oscillator signal during the low voltage period). The length of the period is equal to the oscillating period for the motor to oscillate both clockwise and counter-clockwise to be out of the dead initiating position. Additionally, the oscillator signal sent by the multiplexer 23 can be generated from an oscillator circuit 24 consisted of an IC 241 numbered LM555 as shown in FIG. 8. When the rotor of the motor is out of the dead initiating position, the high voltage period (or the low voltage period) of the triggering signal is over (the end of the first time period in the other word) and then there comes the second start step (operating step) of the motor. In this step, the period of the triggering signal will turn from high voltage to low voltage (or vice versa), which turns the signal transmitted to driver 20 sent by multiplexer 23 to the operating signal input by the multiplexer 23 and thereby causes the motor 30 to rotate in one direction. The operation curve for starting the motor according to the second embodiment of the present invention is as shown in FIG. 9, wherein the x-coordinate represents time and y-coordinate the detector signal output by the signal detector 21. The section c 43 is the trace of the output detector signal by the signal detector 21 when the input start signal thereof is the oscillator signal. The section d 44 is the trace of the output detector signal by the signal detector 21 when the input start signal thereof is the operating signal after the rotor is out of the dead initiating position.

Although the invention has been described in terms of specific preferred embodiments, it will be obvious to one skilled in the art that various modifications and substitutions are contemplated by the invention disclosed herein and that all such modifications and substitutions are included within the scope of the invention as defined in the appended claims.

What is claimed is:

1. A method for starting a motor, comprising:
   generating an oscillator signal by a signal generator within a first time period;
   generating an operating signal by said signal generator within a second time period;
   driving said motor to oscillate both clockwise and counter-clockwise according to said oscillator signal by a driver;

driving said motor to be out of a dead initiating position; and driving said motor to rotate in one direction according to said operating signal by said driver.

2. The method as recited in claim 1, wherein said signal generator further comprises an oscillator for generating said oscillator signal;

a one-shot multivibrator for generating a triggering signal; and a multiplexer for sending either said oscillator signal or said operating signal according to the voltage state of said triggering signal.

3. The method as recited in claim 2, wherein the period of said triggering signal comprises a period of high voltage and a period of low voltage.

4. The method as recited in claim 2, wherein said multiplexer sends said oscillator signal during said period of high voltage of said triggering signal.

5. The method as recited in claim 2, wherein said multiplexer sends said operating signal during said period of low voltage of said triggering signal.

6. The method as recited in claim 2, wherein said multiplexer sends said oscillator signal during said period of low voltage of said triggering signal.

7. The method as recited in claim 2, wherein said multiplexer sends said operating signal during said period of high voltage of said triggering signal.

8. The method as recited in claim 2, wherein said period of high voltage of said triggering signal is equal to the period for said motor to oscillate both clockwise and counter-clockwise to be out of said dead initiating position.

9. A device for controlling a rotor of a motor to be out of a dead initiating position, comprising:

a signal generator for sequentially generating an oscillator signal and an operating signal; and a driver for driving said motor according to said oscillator signal or said operating signal generated by said signal generator;

wherein said oscillator signal is used by said driver to drive said motor during a first time period, and the length of said first time period is equal to that of the period for said motor to oscillate both clockwise and counter-clockwise to be out of said dead initiating position.

10. The device as recited in claim 9, wherein said operating signal is used to drive said driver for driving said motor to rotate in one direction in the end of said first time period.

11. A device for controlling a rotor of a motor to be out of a dead initiating position, comprising:

a one-shot multivibrator for generating a triggering signal;

a multiplexer for sending either an oscillator signal or an operating signal according to the voltage state of said triggering signal; and a driver for driving said motor according to said oscillator signal or said operating signal;

wherein the period of said triggering signal comprises a period of high voltage and a period of low voltage, and said multiplexer sends said oscillator signal during said period of high voltage of said triggering signal.

12. The device as claim recited in 11, wherein said period of high voltage of said triggering signal is equal to the period for said motor to oscillate both clockwise and counter-clockwise to be out of said dead initiating position.

* * * * *